Figure 1:
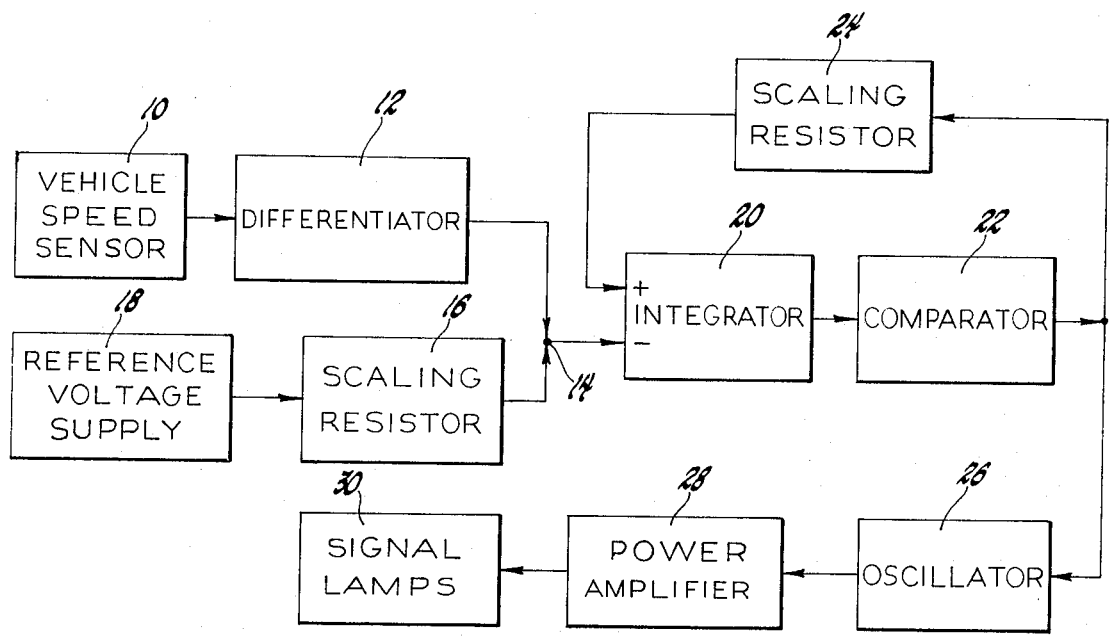

United States Patent [19]
Van Ostrom

[11] 3,794,972
[45] Feb. 26, 1974

[54] DECELERATION SIGNALING APPARATUS HAVING VELOCITY AND DECELERATION DEPENDENT SIGNAL

[75] Inventor: David L. Van Ostrom, Flint, Mich.

[73] Assignee: General Motors Corporation, Detroit, Mich.

[22] Filed: Jan. 12, 1973

[21] Appl. No.: 323,034

[52] U.S. Cl.................................. 340/62, 340/262
[51] Int. Cl............................................. B60q 1/44
[58] Field of Search.............. 340/52 R, 53, 62, 262; 324/78 Q

[56] References Cited
UNITED STATES PATENTS
3,746,986   7/1973   Ciemochowski................ 340/262 X
3,731,193   5/1973   Darrow.......................... 340/262 X Primary Examiner—Alvin H. Waring
Attorney, Agent, or Firm—Howard N. Conkey

[57] ABSTRACT

A deceleration signaling apparatus is provided for comparing actual vehicle deceleration with a reference deceleration and, when the actual vehicle deceleration exceeds the reference deceleration, integrates the net difference to generate a signal representing the difference between the actual vehicle velocity and a reference velocity determined by the reference deceleration. Means are provided for energizing signal lamps for providing deceleration warning while this velocity difference exceeds a predetermined constant. The comparator also functions to shift the magnitude of the reference deceleration from a first level to a second level less than the first level when the difference between the actual vehicle velocity and the reference velocity exceeds the predetermined constant so as to extend the duration of the deceleration warning.

2 Claims, 2 Drawing Figures

PATENTED FEB 26 1974 3,794,972

DECELERATION SIGNALING APPARATUS HAVING VELOCITY AND DECELERATION DEPENDENT SIGNAL

This invention relates to a deceleration warning indicator. More specifically, this invention relates to a decleration warning indicator in which the deceleration warning has a time duration which is dependent upon the magnitude of vehicle braking as represented by both velocity change and magnitude of deceleration.

Known deceleration warning devices carried by a vehicle for providing a warning to following motorists include systems which provide an indication of deceleration during the time period that the magnitude of deceleration exceeds a predetermined value, which provide an indication of vehicle braking during and for a predetermined time period after the braking operation and which provide a warning signal having a frequency and/or duty cycle that is a function of the magnitude of deceleration. As opposed to the aforementioned forms of deceleration warning devices, it is the general object of this invention to provide for a deceleration signaling apparatus in which the duration of the deceleration signal is a function of both vehicle velocity and deceleration.

It is another object of this invention to provide for a deceleration signaling apparatus which provides an indication of the deceleration for a time period dependent upon the amount of braking both in the magnitude of deceleration and vehicle velocity change.

It is another object of this invention to provide for a deceleration signaling apparatus in which the duration of the deceleration signal is controlled by comprising actual vehicle deceleration with a reference deceleration and determining the difference in the actual vehicle velocity and a reference velocity determined by the reference deceleration and flashing signal lamps when the velocity difference exceeds a predetermined value.

These and other objects of this invention are accomplished by monitoring the vehicle speed which is differentiated to provide a signal representing vehicle acceleration or deceleration. The vehicle acceleration or deceleration is summed with a reference deceleration and when vehicle deceleration exceeds the reference deceleration, the net difference is integrated to provide a signal representing the difference between the actual vehicle velocity and a reference velocity determined by the reference deceleration. When this velocity difference exceeds a predetermined value, a comparator generates an output signal to energize an oscillator to effect the flashing of signal lamps, the duration of the flashing signal being dependent upon the velocity change and the magnitude of deceleration of the vehicle.

Figure 2:
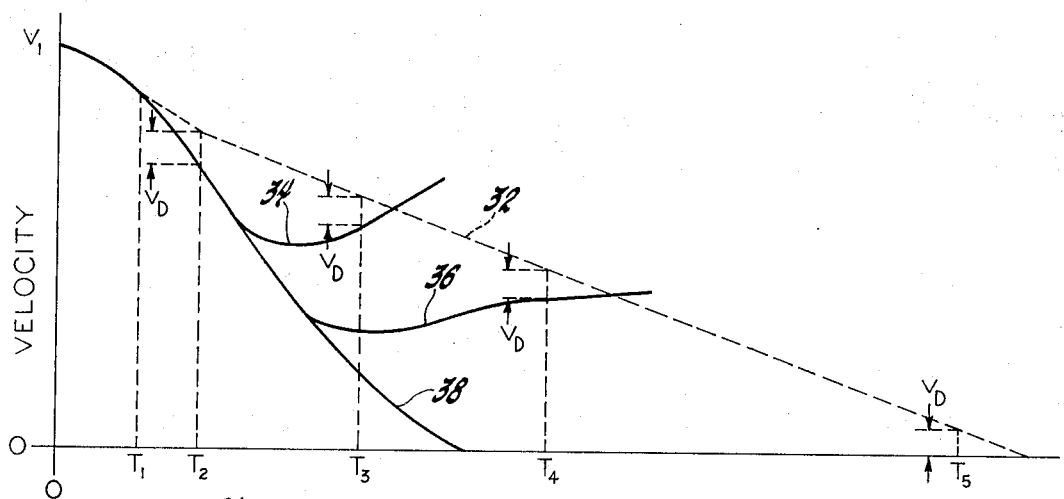

The invention may be best understood by reference to the following description of a preferred embodiment and the drawings in which:

FIG. 1 is a block diagram of the deceleration signaling apparatus of the subject invention; and FIG. 2 is a graph of actual vehicle velocity and reference velocity versus time illustrating the dependency of the time duration of the deceleration signal on the velocity change and magnitude of deceleration of the vehicle.

Referring to FIG. 1, there is shown the block diagram of an apparatus carried by a vehicle to provide a deceleration warning signal rearward thereof to following motorists. As shown therein, a vehicle speed sensor 10 generates a DC voltage having a magnitude directly related to vehicle speed. The vehicle speed sensor 10 may take the form of any of the well known sensors for monitoring vehicle speed such as, for example, a wheel driven member having teeth which alter the reluctance of a magnetic flux path to vary the flux threading a coil. The output of the coil of this form of sensor is then converted from a frequency representing wheel speed to a DC voltage representing wheel speed. This DC voltage is also representative of vehicle velocity.

The output voltage of the vehicle speed sensor 10 is supplied to a differentiator 12 which differentiates the output voltage and supplies current to a summing junction 14 having a magnitude directly related to acceleration or deceleration of the vehicle. If the vehicle is accelerating, current will flow from the differentiator 12 into the summing junction 14 and if the vehicle is decelerating, current will flow out of the summing junction 14 into the differentiator. The differentiator 12 may take the form of a capacitor series coupled between the vehicle speed sensor 10 and the summing junction 14.

Vehicle acceleration and deceleration, as represented by the current output of the differentiator 12, is summed at the summing junction 14 with a first level of a reference deceleration as represented by a constant current supplied to the summing junction 14 through a scaling resistor 16 by a reference voltage supply 18. The output of the summing junction 14 is coupled to the negative input terminal of an integrator 20 and is comprised of a current having a magnitude directly proportional to the sum of the inputs thereto from the differentiator 12 and the scaling resistor 16. As can be seen, this current will flow out of the summing junction 14 (a positive signal input to the negative input terminal of the integrator 20) when the output of the differentiator 12 represents vehicle acceleration or represents vehicle deceleration with a magnitude less than the magnitude of the first level of the reference deceleration and will flow into the summing junction 14 (a negative signal input to the negative input terminal of the integrator 20) when the output of the differentiator 16 represents vehicle deceleration with a magnitude greater than the first level of the reference deceleration.

The integrator 20 is of a conventional design which has both positive and negative input terminals and functions to generate an output voltage representing the integral of the summation of the input currents to those terminals. The integrator 20 can take the form of an operational amplifier having capacitive feedback from its output to its negative input terminal. The integrator 20 also is of the known type having a lower output saturation level of zero volts. Consequently, when the integral of the summation of the inputs to the positive and negative input terminals is zero or negative, the output of the integrator 20 is at the lower saturation level of zero volts. Conversely, when the integral of the summation of the inputs to the positive and negative input terminals is positive, the integrator 20 will generate a positive voltage having a magnitude representing the integral.

The output of the integrator 20 is supplied to a comparator 22 having an output normally at zero volts. The comparator 22 is responsive to a voltage input thereto above a predetermined threshold to shift its output to a positive voltage level. The output of the comparator 22 is coupled through a scaling resistor 24 to the positive input terminal of the integrator 20.

When the output of the comparator 22 is shifted to the aforementioned positive voltage level, the current supplied to the positive input of the integrator 20 through the scaling resistor 24 is effective for decreasing the magnitude of the reference deceleration from the first level to a second level as represented by the difference between the current supplied to the summing junction 14 through the scaling resistor 16 and the current supplied to the positive input of the integrator 20 through the scaling resistor 24.

The output of the comparator 22 is also coupled to an oscillator 26 which is energized when the output of the comparator 22 is at the positive voltage level to supply pulsating power to a power amplifier 28 which is periodically enabled thereby to flash a plurality of signal lamps 30, the signal lamps 30 being flashed at the frequency of the oscillator 26 for the duration of the positive voltage output of the comparator 22. The signal lamps 30 are positioned at the rear of the vehicle so as to provide deceleration warning to following motorists.

The operation of the system of FIG. 1 will now be described with reference to the plot of FIG. 2 in which velocity is plotted as a function of time. As shown in FIG. 2, a dotted line 32 represents a reference vehicle velocity and has a slope determined by the reference deceleration and the solid lines 34, 36 and 38 represent three different actual vehicle velocity profiles illustrating, in conjunction with the curve 32, the subject invention.

Assuming the actual vehicle speed has been and is at a constant velocity $V_1$, the output of the integrator 20 is at the lower saturation level of zero volts. Consequently, the output of the comparator is at zero volts and the oscillator 26, the power amplifier 28 and the signal lamps 30 are deenergized. in addition, no current is supplied to the positive input terminal of the integrator 20 through the scaling resistor 24. At time zero, the vehicle operator actuates the vehicle brakes and the vehicle begins to decelerate. At time $T_1$, the vehicle deceleration exceeds the first level of the reference deceleration which results in a negative signal input to the negative input terminal of the integrator 20, the signal having a magnitude representing the difference between actual vehicle deceleration and the first level of the reference deceleration. Consequently, at time $T_1$, the integrator 20 begins to generate a voltage having a magnitude representing the integral of the difference between the actual vehicle deceleration and the reference deceleration. This integral is a direct measurement of the difference between the actual velocity of the vehicle and a reference velocity having the same magnitude as the actual vehicle velocity at time $T_1$ and decreasing therefrom at a rate equal to the first level of the reference deceleration. This reference velocity is represented by the dotted line curve 32 of FIG. 2 beginning at time $T_1$. As long as the actual vehicle deceleration exceeds the first level of the reference deceleration, the difference between the reference velocity and actual vehicle velocity, as represented by the output of the integrator 20, increases until at time $T_2$ a predetermined velocity difference $V_D$ is reached. As can be seen, this time is dependent upon the magnitude of the vehicle deceleration. The predetermined velocity difference $V_D$ is represented by an input voltage to the comparator which equals the predetermined threshold. The comparator 22 then shifts its output from zero volts to the positive voltage level. When the comparator 22 shifts its output to the positive voltage level, the oscillator 26 is energized to periodically pulse the power amplifier 28 which flashes the signal lamps 30 to indicate to following motorists of the deceleration exceeding the reference deceleration. In addition, at time $T_2$ when the output of the comparator is shifted to the positive voltage level, the current supplied to the positive input of the integrator 20 through the scaling resistor 24 shifts the reference deceleration from the first level to the second level as previously described. Consequently, at time $T_2$, the slope of the reference velocity curve 32 changes to reflect the second level of the reference deceleration, the second level being less than the first level.

Assuming the velocity profile represented by the solid line curve 34, in which curve the vehicle deceleration decreases to zero and the vehicle is then accelerated, when the vehicle deceleration decreases to a level less than the second level of the reference deceleration, the magnitude of the output voltage of the integrator 20 begins to decrease until at time $T_3$, the difference between the reference velocity and the actual vehicle velocity decreases below the predetermined velocity difference $V_D$. At this time, the input to the comparator 22 decreases below the predetermined threshold and the comparator 22 shifts its output from the positive voltage level to zero volts to deenergize the oscillator to effect termination of the deceleration signal.

Assuming the vehicle velocity profile illustrated by the solid line curve 36, which curve represents a greater reduction of the velocity of the vehicle, it is not until time $T_4$ that the output of the integrator decreases to a magnitude representing the predetermined velocity difference $V_D$ between the reference velocity and the actual vehicle velocity to shift the output of the comparator 22 from the positive voltage level to ground potential. As can be seen, the time duration that the signal lamps 30 are flashed with the velocity profile 36 is substantially greater than the time the signal lamps were flashed with the velocity profile 34.

The velocity profile 38 assumes the vehicle is braked to a stop. As can be seen, the signal lamps 30 are then flashed until time $T_5$ at which time the reference velocity decreases to the predetermined velocity difference $V_D$ at which time the comparator 22 shifts its output to ground potential.

As can be seen from FIG. 2, the deceleration signal is a function of the magnitude of deceleration and also the velocity change during braking. In addition, it can be seen that if the vehicle is braked and then accelerated, the time duration that the signal lamps 30 are flahsed is reduced as compared to the case where the vehicle is not accelerated.

The description of the preferred embodiment refers to two levels of reference deceleration for illustration purposes only. It will be understood by one skilled in the art that the second level can be eliminated. Two levels of reference deceleration allows the use of the higher level to prevent normal decelerations from implementing the flashing of the signal lamps 30 and the use of the lower level to provide for an increased time duration of deceleration indication.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. An apparatus for providing an indication of the deceleration of a vehicle comprising: vehicle velocity sensing means for generating a velocity signal having a magnitude directly proportional to vehicle velocity; differentiating means coupled to the vehicle velocity sensing means and responsive to the velocity signal for generating a rate signal representing the rate of change of the vehicle velocity; means for generating a deceleration reference signal having a magnitude representing a predetermined deceleration warning level; means for summing the rate signal and the deceleration reference signal and generating a resultant signal; integrating means coupled to the last mentioned means and responsive to the resultant signal for generating a velocity difference signal having a magnitude representing the amount that the time integral of the predetermined deceleration warning level exceeds the vehicle velocity; comparator means coupled to the integrating means and responsive to the velocity difference signal for generating a signal control voltage when the magnitude of the velocity difference signal exceeds a predetermined threshold level; signal lamps; and means coupled to the comparator and responsive to the signal control voltage for energizing the signal lamps to provide an indication of the deceleration of the vehicle, whereby said indication is dependent upon the magnitude of deceleration and vehicle velocity change.

2. An apparatus for providing an indication of the deceleration of a vehicle comprising: vehicle velocity sensing means for generating a voltage signal having a magnitude directly proportional to the vehicle velocity; differentiating means coupled to the vehicle velocity sensing means and responsive to the velocity signal for generating a rate signal representing the rate of change of vehicle velocity; means for generating a deceleration reference signal, said deceleration reference signal being normally at a first level representing a first predetermined deceleration level and being shiftable to a second level less than the first level, the second level representing a second predetermined deceleration level; means for summing the rate signal and the deceleration reference signal and generating resultant signal; integrating means coupled to the last mentioned means and responsive to the resultant signal for generating a velocity difference signal having a magnitude representing the amount that the time integral of the deceleration reference signal exceeds the vehicle velocity; comparator means coupled to the integrating means and responsive to the velocity difference signal for generating a control voltage when the magnitude of the velocity difference signal exceeds a predetermined threshold level; means coupled to the comparator means and responsive to the control voltage for shifting the reference deceleration signal from the first level to the second level; signal lamps; and means coupled to the comparator and responsive to the control voltage for fashing the signal lamps to provide an indication of vehicle deceleration, whereby the deceleration indication is a function of the magnitude of vehicle deceleration and the change in vehicle velocity.

* * * * *